United States Patent [19]
Allen et al.

[11] Patent Number: 6,006,037
[45] Date of Patent: Dec. 21, 1999

[54] COMPACT CAMERA WITH FRAME COUNTER AND VIEWFINDER INTEGRATED TO CONSERVE SPACE

[75] Inventors: Loretta E. Allen, Hilton; Roger A. Siekierski, Webster, both of N.Y.

[73] Assignee: Eastman Kodak Company, Rochester, N.Y.

[21] Appl. No.: 09/189,457

[22] Filed: Nov. 10, 1998

[51] Int. Cl.⁶ .................................................. G03B 17/24
[52] U.S. Cl. ............................... 396/6; 396/284; 396/296
[58] Field of Search .............................. 396/284, 6, 296, 396/535

[56] References Cited

U.S. PATENT DOCUMENTS

| | | |
|---|---|---|
| 422,686 | 3/1890 | Altick . |
| 1,219,672 | 3/1917 | Schoenleber . |
| 2,585,451 | 2/1952 | Frankel . |
| 3,677,147 | 7/1972 | Kremp et al. . |
| 3,836,691 | 9/1974 | Wolfe . |
| 4,114,172 | 9/1978 | Yao . |
| 4,645,322 | 2/1987 | Stella et al. . |
| 5,339,125 | 8/1994 | Fridman et al. . |

*Primary Examiner*—David M. Gray
*Attorney, Agent, or Firm*—Roger A. Fields

[57] ABSTRACT

A compact camera which comprises a viewfinder having a pair of spaced front objective and rear eye lenses for viewing a subject to be photographed when one's eye is brought close to the rear eye lens to look at the subject through the viewfinder, and a frame counter supported for movement in a space between the front objective and rear eye lenses to view exposure related indicia of the frame counter when looking through the viewfinder, is characterized in that the frame counter has a transparent carrier for the exposure related indicia which is movable adjacent the rear eye lens to permit the exposure related indicia to be viewed through the viewfinder only when one's eye is farther from the rear eye lens than when one's eye is brought close to the rear eye lens to look at the subject to be photographed and to permit one to view the subject without seeing the exposure related indicia when one's eye is brought close to the rear eye lens.

8 Claims, 6 Drawing Sheets

COMPACT CAMERA WITH FRAME COUNTER AND VIEWFINDER INTEGRATED TO CONSERVE SPACE

CROSS REFERENCE TO RELATED APPLICATIONS

Reference is made to commonly assigned copending applications Ser. No. 09/188,965, entitled COMPACT CAMERA WITH FRAME COUNTER MADE FLEXIBLE TO CONSERVE SPACE and filed Nov. 10, 1998 in the names of Loretta E. Allen and Dennis R. Zander, and Ser. No. 09/189,970, entitled CAMERA WITH FRAME COUNTER READABLE AT SEPARATE LOCATIONS and filed Nov. 10, 1998 in the name of Loretta E. Allen.

FIELD OF THE INVENTION

The invention relates generally to the field of photography, and in particular to compact cameras. More specifically, the invention relates to a compact camera with a frame counter and a viewfinder that are integrated to conserve space.

BACKGROUND OF THE INVENTION

Film and cameras that are all in one, commonly referred to as one-time-use cameras, have become well known. The one-time-use camera is a simple point-and-shoot type comprising a plastic main body part which supports a conventional film cassette in a cassette receiving or film take-up chamber, an unexposed film roll prewound on a film spool in a film supply chamber from the film cassette, a fixed-focus taking lens, a film metering mechanism with a rotatably supported metering sprocket that engages the filmstrip, a manually rotatable film winding thumbwheel rotatably engaged with a film spool inside the film cassette, a single-blade shutter, a manually depressible shutter release button, a rotatable frame counter disk or wheel for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cassette. This winds an exposed section of the filmstrip into the film cassette. The rewinding movement of the filmstrip the equivalent of slightly more than one frame width rotates the metering sprocket in engagement with the filmstrip to decrement the frame counter disk to its next lower-numbered setting and to pivot a metering lever into engagement with the thumbwheel to prevent farther manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cassette, the one-time-use camera is given to a photofinisher who tears the outer box off the camera unit, separates the rear cover part from the main body part, and removes the film cassette with the exposed filmstrip from the film take-up chamber. Then, he removes the exposed filmstrip from the film cassette to develop the negatives and make prints for the customer. At least some of the used camera parts may be recycled, i.e. reused, to remanufacture the camera

PROBLEM

It is a continuing challenge to make one-time-use cameras as compact as is reasonably possible. In this connection, prior art U.S. Pat. No. 2,585,451 issued Feb. 12, 1952 discloses a compact camera which comprises a viewfinder having a pair of spaced front objective and rear eye lenses for viewing a subject to be photographed when one's eye is brought close to the rear eye lens to look at the subject through the viewfinder, and a frame counter supported for movement in a space between the front objective and rear eye lenses to view exposure related indicia of the frame counter when looking through the viewfinder.

THE CROSS-REFERENCED APPLICATIONS

Cross-referenced application Ser. No. 09/188,965, entitled COMPACT CAMERA WITH FRAME COUNTER MADE FLEXIBLE TO CONSERVE SPACE discloses a compact camera comprising a frame counter disk supported for rotation to indicate the number of exposures remaining to be made on a filmstrip, characterized in that the frame counter disk is flexible, has a curved periphery, is bent along a straight line joining two spaced points on the curved periphery to be located in two different planes in order to conserve space, and has a plurality of exposure related indicia that is moved successively from one of the planes to the other plane as the frame counter disk is rotated.

Cross-referenced application Ser. No. 09/189,970, entitled CAMERA WITH FRAME COUNTER READABLE AT SEPARATE LOCATIONS discloses a camera comprising a rear opening, and a flexible web frame counter supported for movement to be within direct view through the rear opening to see exposure related indicia of the frame counter when looking through the rear opening, characterized in that a top opening is positioned to permit the frame counter to be within direct view through the top opening to see the exposure related indicia when looking through the top opening.

SUMMARY OF THE INVENTION

According to a preferred embodiment of the invention, a compact camera which comprises a viewfinder having a pair of spaced front objective and rear eye lenses for viewing a subject to be photographed when one's eye is brought close to the rear eye lens to look at the subject through the viewfinder, and a frame counter supported for movement in a space between the front objective and rear eye lenses to view exposure related indicia of the frame counter when looking through the viewfinder, is characterized in that:

the frame counter has a transparent carrier for the exposure related indicia which is movable adjacent the rear eye lens to permit the exposure related indicia to be viewed through the viewfinder only when one's eye is farther from the rear eye lens than when one's eye is brought close to the rear eye lens to look at the subject to be photographed and to permit one to view the subject without seeing the exposure related indicia when one's eye is brought close to the rear eye lens.

BRIEF DESCRIIPIION OF THE DRAWINGS

DETAILED DESCRIPTION OF THE INVENTION

The invention is disclosed as being embodied preferably in a one-time-use camera Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Preferred Embodiment—FIGS. 1, 2, 3 and 4

Figure 1:
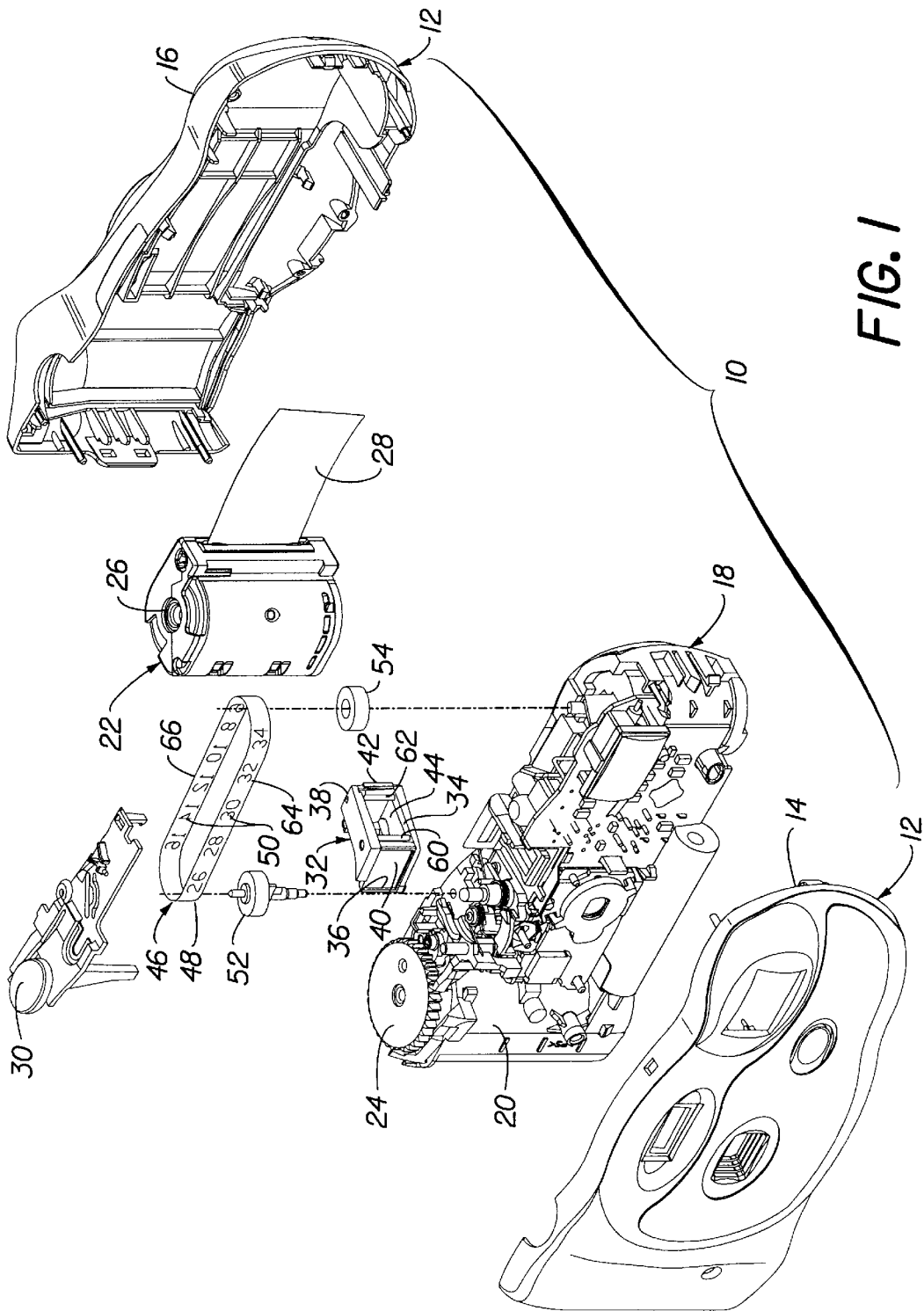
FIG. 1 is an exploded front perspective view of a one-time-use camera according to the preferred embodiment of the invention.
Figure 2:
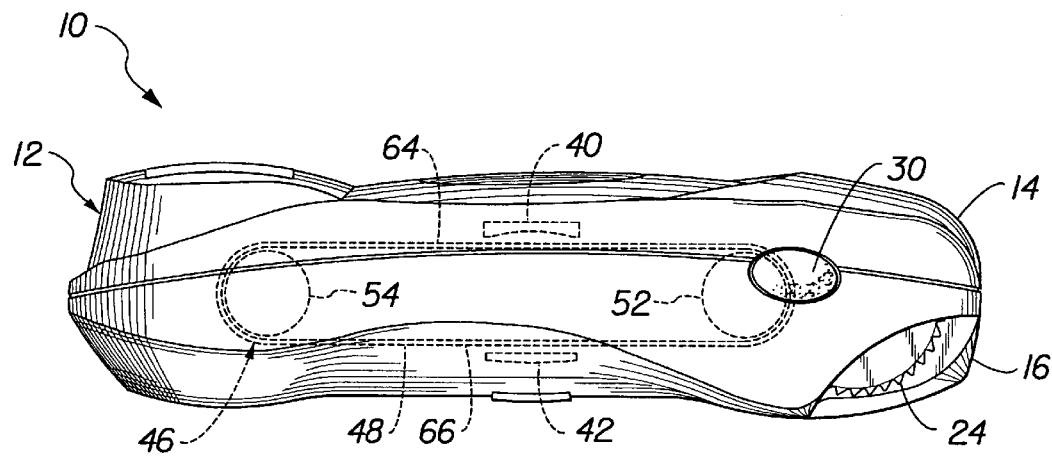
FIG. 2 is a top plan view of the one-time-use camera depicted in FIG. 1.
Figure 3:
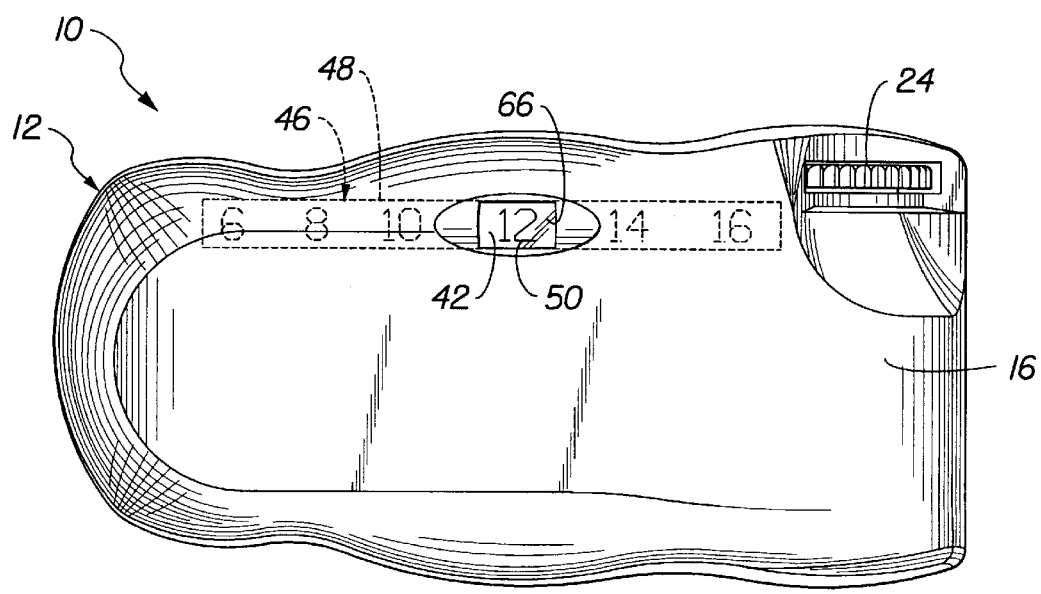
FIG. 3 is a rear elevation view of the one-time-use camera depicted in FIG.1.

Referring now to the drawings, FIG. 1 shows a one-time-use camera 10 in which an opaque camera housing 12 constitutes a front cover part 14 and a rear cover part 16. The front cover part 14 and the rear cover part 16 are connected to one another and to a main body part 18 to house the main body part between them.

The main body part 18 has a cassette receiving or film take-up chamber 20 for a known film cassette 22. A film winding thumbwheel 24 rotatably supported on the main body part is 18 is coaxially engaged with a film spool 26 inside the film cassette 22. After each picture is taken with the one-time-use camera 10, the photographer manually rotates the thumbwheel 24 in a film winding direction, counter-clockwise in FIG. 1, to similarly rotate the film spool 26 inside the film cassette 22. This winds an exposed section of a filmstrip 28 into the film cassette 22. A cantilevered shutter release button 30 is supported on the main body part 18 to be manually depressed to initiate picture-taking.

An optical viewfinder 32 has an open box-like skeletal frame 34 that is connected to the main body part 18. The skeletal frame 34 has an open front 36 and an open rear 38 in which a front objective lens 40 and a rear eye lens 42 are fixed. An air space 44 within the skeletal frame 34 separates the front objective and rear eye lenses 40 and 42. As is typical, a subject to be photographed is viewed through the viewfinder 32 when one's eye is brought close to, i.e. within approximately an inch of, the rear eye lens 42 to look at the subject through the viewfinder.

Figure 4:
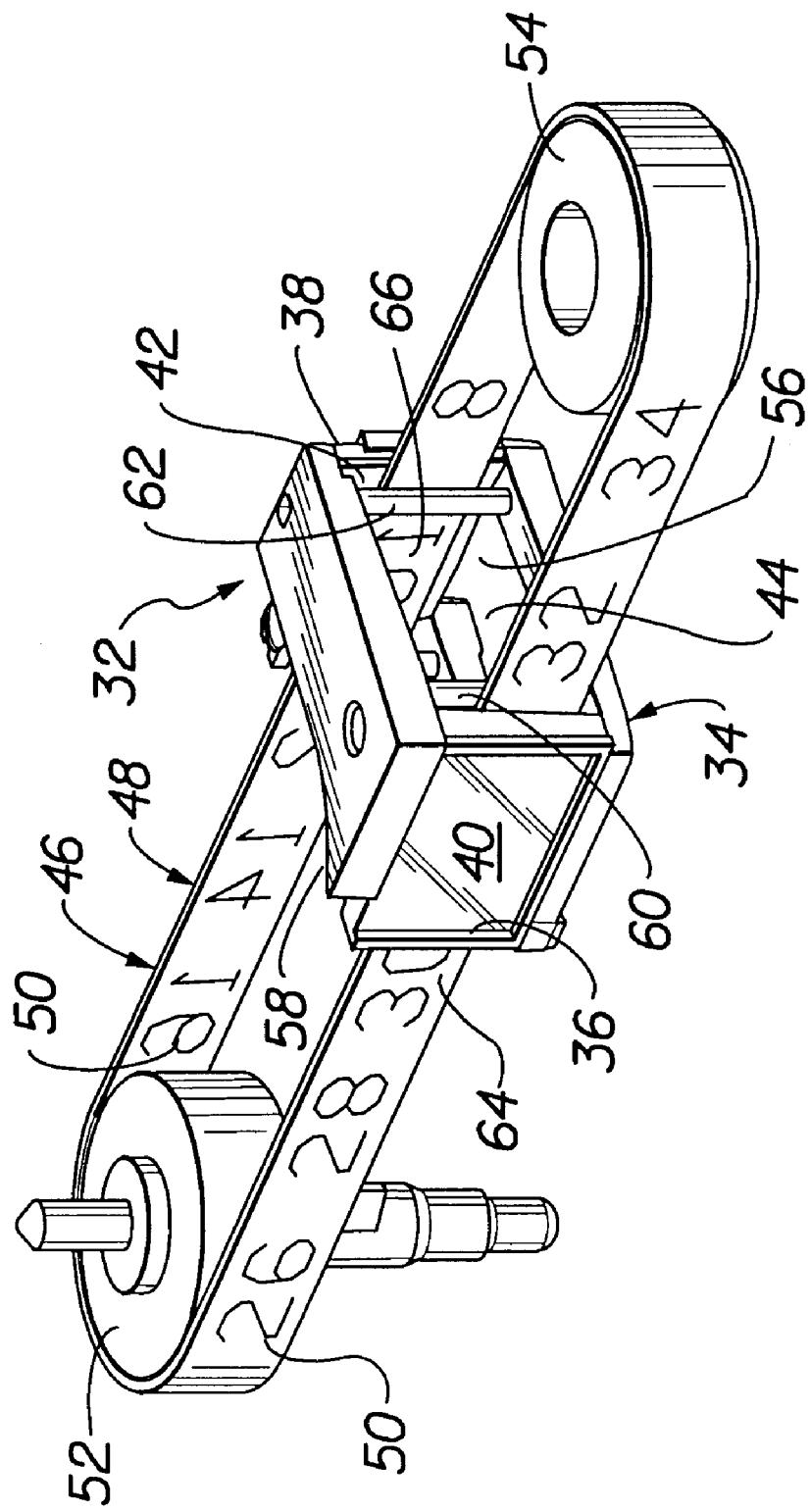
FIG. 4 is a front perspective view of an integrated frame counter and viewfinder in the one-time-use camera depicted in FIG. 1.

As shown in FIGS. 1–4, a frame counter 46 for indicating the number of exposures remaining to be made on the filmstrip 28 is a flexible transparent carrier web 48 formed into a continuous closed loop. The carrier web 48 has a single set of exposure related opaque indicia 50 along successive short longitudinal portions of the carrier web, and extends lengthwise partially around a pair of parallel axis drive and idler pulleys 52 and 54 to support the carrier web for rotation partially around the pulleys. The drive pulley 52 is rotated in a known way, for example via a gear connection with the film winding thumbwheel 24 or via a coaxial connection with a metering sprocket (not shown). When the photographer manually rotates the thumbwheel 24 in the film winding direction, counter-clockwise in FIG. 1, to similarly rotate the film spool 26 inside the film cassette 22, to wind an exposed section of a filmstrip 28 into the film cassette 22, the carrier web 48 is incrementally moved through opposite open sides 56 and 58 of the skeletal frame 34 to similarly move across the air space 44 between the front objective and rear eye lenses 40 and 42. A pair of parallel front guide pins 60 (only one shown) proximate the front objective lens 40 and a pair of parallel rear guide pins 62 (only one shown) proximate the rear eye lens 42 support opposite (parallel) successive front and rear short longitudinal portions 64 and 66 of the carrier web 48 adjacent (behind and in front of, in FIGS. 2 and 4) the front objective and rear eye lenses. This is best shown in FIG. 4. The exposure related indicia 50 on the carrier web 48 can be successively seen, i.e. successively read, through the viewfinder 32 only when one's eye is farther from the rear eye lens 42 than when one's eye is brought close to the rear eye lens to look at the subject to be photographed. Conversely, when one's eye is brought close to the rear eye lens 42 to view the subject the subject to be photographed, the exposure related indicia 50, because it is close to one's eye, cannot be seen (read). Thus, in FIG. 3, the exposure related indicia 50, which is the number "12" in FIG. 3, can only be seen (read) when one's eye is not brought close to the rear eye lens 42.

Alternate Embodiment—FIGS. 5, 6, 7, 8 and 9

Figure 5:
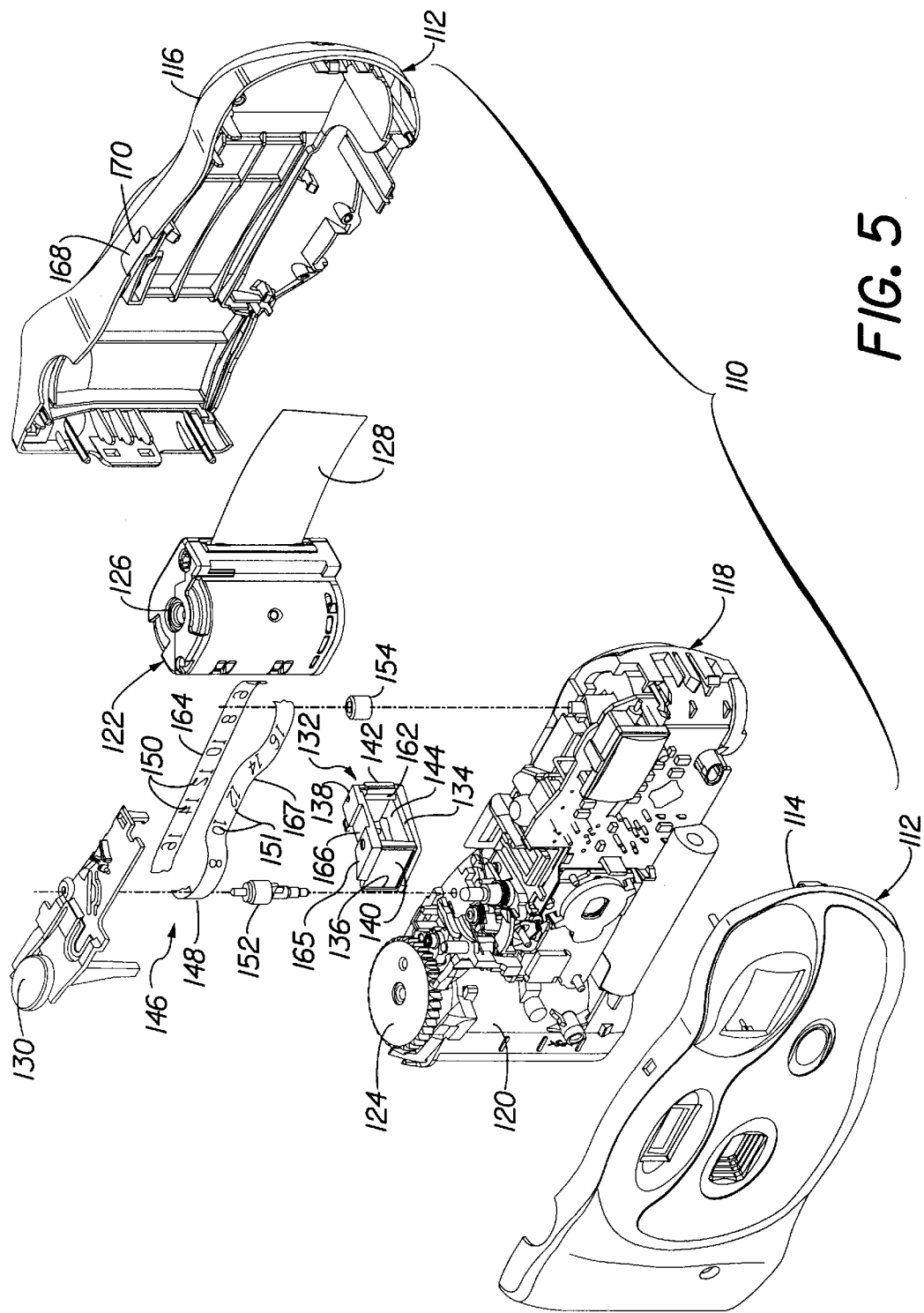
FIG. 5 is an exploded front perspective view of a one-time-use camera according to an alternate embodiment of the invention.

FIG. 5 shows a one-time-use camera 110 in which an opaque camera housing 112 constitutes a front cover part 114 and a rear cover part 116. The front cover part 114 and the rear cover part 116 are connected to one another and to a main body part 118 to house the main body part between them.

The main body part 118 has a cassette receiving or film take-up chamber 120 for a known film cassette 122. A film winding thumbwheel 124 rotatably supported on the main body part is 118 is coaxially engaged with a film spool 126 inside the film cassette 122. After each picture is taken with the one-time-use camera 110, the photographer manually rotates the thumbwheel 124 in a film winding direction, counter-clockwise in FIG. 5, to similarly rotate the film spool 126 inside the film cassette 122. This winds an exposed section of a filmstrip 128 into the film cassette 122. A cantilevered shutter release button 130 is supported on the main body part 118 to be manually depressed to initiate picture-taking.

An optical viewfinder 132 has an open box-like skeletal frame 134 that is connected to the main body part 118. The skeletal frame 134 has an open front 136 and an open rear 138 in which a front objective lens 140 and a rear eye lens 142 are fixed. An air space 144 within the skeletal frame 134 separates the front objective and rear eye lenses 140 and 142. As is typical, a subject to be photographed is viewed through the viewfinder 132 when one's eye is brought close to, i.e. within approximately an inch of, the rear eye lens 142 to look at the subject through the viewfinder.

Figure 6:
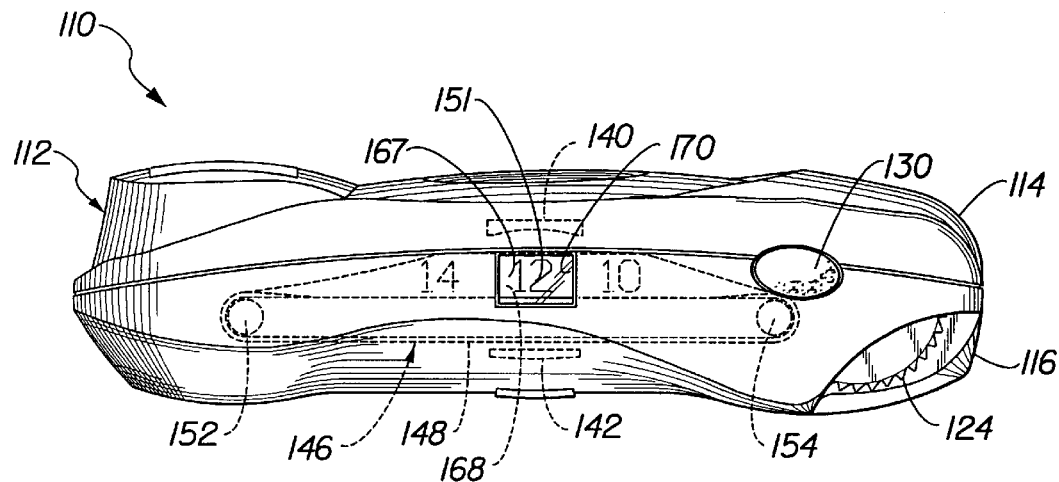
FIG. 6 is a top plan view of the one-time-use camera depicted in FIG. 5.
Figure 7:
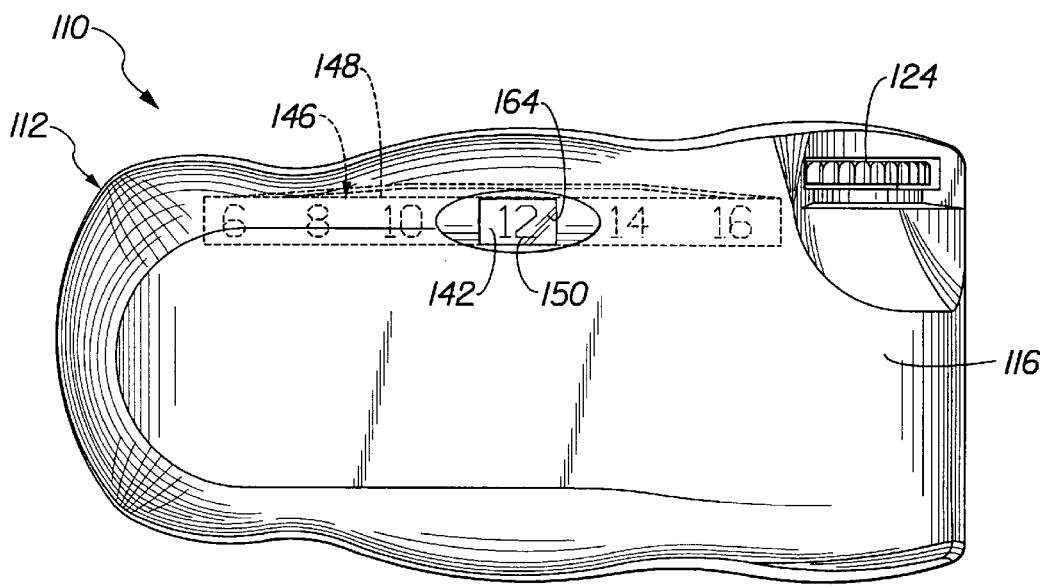
FIG. 7 is a rear elevation view of the one-time-use camera depicted in FIG. 5.
Figure 8:
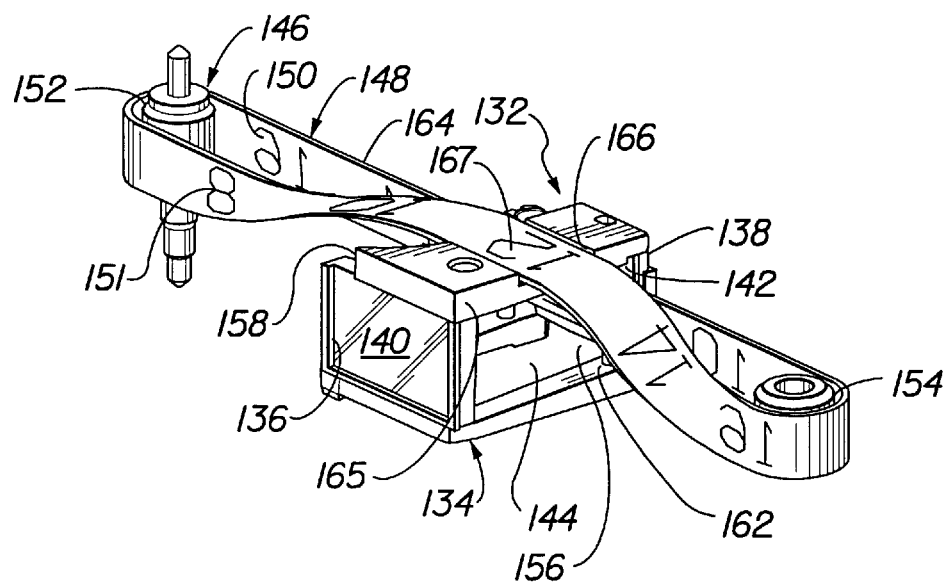
FIG. 8 is a front perspective view of an integrated frame counter and viewfinder in the one-time-use camera depicted in FIG. 5.
Figure 9:
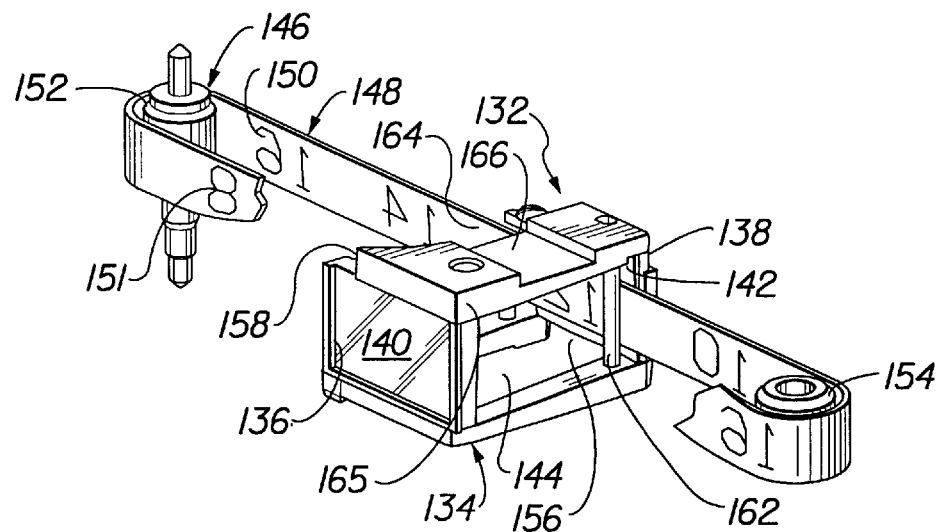
FIG. 9 is a front perspective view of the integrated frame counter and viewfinder of FIG. 8, but with a longitudinal portion of the frame counter removed for illustration purposes.

As shown in FIGS. 5–9, a frame counter 146 for indicating the number of exposures remaining to be made on the filmstrip 128 is a flexible transparent carrier web 148 formed into a continuous closed loop. The carrier web 148 has a two identical sets of exposure related opaque indicia 150 and 151 along successive short longitudinal portions of the carrier web, and extends lengthwise partially around a pair of parallel axis drive and idler pulleys 152 and 154 to support the carrier web for rotation partially around the pulleys. The drive pulley 152 is rotated in a known way, for example via a gear connection with the film winding thumbwheel 124 or via a coaxial connection with a metering sprocket (not shown). When the photographer manually rotates the thumbwheel 124 in the film winding direction, counter-clockwise in FG. 5, to similarly rotate the film spool 126 inside the film cassette 122, to wind an exposed section of a filmstrip 128 into the film cassette 122, the carrier web 148 is incrementally moved through opposite open sides 156 and 158 of the skeletal frame 134 to similarly move across the air space 144 between the front objective and rear eye lenses 140 and 142. A pair of parallel rear guide pins 162 (only one shown) proximate the rear eye lens 142 support successive rear short longitudinal portions 164 of the carrier web 148 adjacent (in front of in FIGS. 7–9) the rear eye lenses. This is best shown in FIG. 9. A top plate 165 of the skeletal frame 134 has a top guide channel 166 that supports successive top short longitudinal portions 167 of the carrier web 148 over the air space 144 and beneath a top window 168 within a top opening 170 in the rear cover part 116. See FIGS. 6, 8 and 9. The exposure related indicia 150 and 151 on the carrier web 148 can be successively seen, i.e. successively read, through the viewfinder 132 only when one's eye is farther from the rear eye lens 142 than when one's eye is brought close to the rear eye lens to look at the subject to be photographed. Conversely, when one's eye is brought close to the rear eye lens 142 to view the subject the subject to be photographed, the exposure related indicia 150 or 151, because it is close to one's eye, cannot be seen (read). Thus, in FIG. 7, the exposure related indicia 150, which is the number "12" in FIG. 7, can only be seen (read) when one's eye is not brought close to the rear eye lens 142. The exposure related indicia 150 and 151 can be successively seen, i.e. successively read, at the top window 168. Thus, in FIG. 6, the exposure related indicia 151, which is the number "12" in FIG. 6, can be seen (read) at the top window 168. The exposure related indicia 151, which is the number "12" in FIG. 6, is adjacent the top window 168 at the same time that the exposure related indicia 150, which is the number "12" in FIG. 7, is adjacent the rear eye lens 142.

The invention has been described with reference to a preferred embodiment. However, it will be appreciated that variations and modifications can be effected by a person of ordinary skill in the art without departing from the scope of the invention. For example, the viewing lens 66 instead of being at the rear portion 64 of the rear cover part 16 could be at the abutting top portions 60 and 62 of the camera front and rear cover parts 14 and 16.

PARTS LIST
10. one-time-use camera
12. camera housing
14. front cover part
16. rear cover part
18. mainbodypart
20. cassette receiving chamber
22. film cassette
24. film winding thumbwheel
26. film spool
28. filmstrip
30. shutter release button
32. viewfinder
34. skeletal frame
36. open front
38. open rear
40. front objective lens
42. rear eye lens
44. air space
46. frame counter
48. carrier web
50. exposure related indicia
52. drive pulley
54. idler pulley
56. open side
58. open side
60. front guide pins
62. rear guide pins
64. successive front web portions
66. successive rear web portions
110. one-time-use camera
112. camera housing
114. front cover part
116. rear cover part
118. main body part
120. cassette receiving chamber
122. film cassette
124. film winding thumbwheel
126. film spool
128. filmstrip
130. shutter release button
132. viewfinder
134. skeletal frame
136. open front
138. open rear
140. front objective lens
142. rear eye lens
144. air space
146. frame counter
148. carrier web
150. exposure related indicia
151. exposure related indicia
152. drive pulley
154. idler pulley
156. open side
158. open side
162. rear guide pins
164. successive rear web portions
165. top plate
166. top guide channel
167. successive top web portions
168. top window
170. top opening

What is claimed is:

1. A compact camera which comprises a viewfinder having a rear eye opening for viewing a subject to be photographed when one's eye is brought close to said rear eye opening to look at the subject through said viewfinder, and a frame counter supported for movement to view successive exposure related indicia of said frame counter when looking into said viewfinder, is characterized in that:

said frame counter has a transparent carrier for said exposure related indicia which is movable adjacent said rear eye opening to permit said exposure related indicia to be viewed in said viewfinder only when one's eye is farther from said rear eye opening than when one's eye is brought close to said rear eye opening to look at the subject to be photographed and to permit one to view the subject without seeing said exposure related indicia when one's eye is brought close to said rear eye opening.

2. A compact camera which comprises an optical viewfinder having a pair of spaced front objective and rear eye lenses for viewing a subject to be photographed when one's eye is brought close to said rear eye lens to look at the subject through said viewfinder, and a frame counter supported for movement in a space between said front objective and rear eye lenses to view successive exposure related indicia of said frame counter when looking into said viewfinder, is characterized in that:

said frame counter has a transparent carrier for said exposure related indicia which is movable adjacent said rear eye lens to permit said exposure related indicia to be viewed in said viewfinder only when one's eye is farther from said rear eye lens than when one's eye is brought close to said rear eye lens to look at the subject to be photographed and to permit one to view the subject without seeing said exposure related indicia when one's eye is brought close to said rear eye lens.

3. A compact camera as recited in claim 2, wherein said transparent carrier is a flexible continuous web having opposite portions movable adjacent said front objective and rear eye lenses.

4. A compact camera as recited in claim 3, wherein said viewfinder has respective web guides that support said opposite portions of said flexible continuous web adjacent said front objective and rear eye lenses.

5. A compact camera as recited in claim 2, wherein said transparent carrier is a flexible continuous web movable adjacent said rear eye lens and over said space between said front objective and rear eye lenses.

6. A compact camera as recited in claim 5, wherein said viewfinder has one web guide that supports said flexible continuous web adjacent said rear eye lens and another web guide that supports the flexible continuous web over said space between said front objective and rear eye lenses.

7. A compact camera as recited in claim 5, wherein a window is positioned over said space between said front objective and rear eye lenses to permit said exposure related indicia to be viewed through said window in addition to being viewed in said viewfinder.

8. A compact camera as recited in claim 2, wherein said viewfinder has an open skeletal frame that supports said front objective and rear eye lenses and contains said space between said front objective and rear eye lenses, and said transparent carrier is a flexible continuous web supported for movement through opposite open sides of said skeletal frame to move across said space between said front objective and rear eye lenses.

* * * * *